United States Patent
Acker, Jr.

(10) Patent No.: US 6,935,570 B2
(45) Date of Patent: Aug. 30, 2005

(54) VENTILATION SYSTEM WITH HUMIDITY RESPONSIVE VENTILATION CONTROLLER

(75) Inventor: Phillip F. Acker, Jr., San Mateo, CA (US)

(73) Assignee: Phillip F. Acker, San Mateo, CA (US)

(*) Notice: Subject to any disclaimer, the term of this patent is extended or adjusted under 35 U.S.C. 154(b) by 0 days.

(21) Appl. No.: 10/653,065

(22) Filed: Sep. 3, 2003

(65) Prior Publication Data

US 2004/0041036 A1 Mar. 4, 2004

Related U.S. Application Data

(60) Provisional application No. 60/407,677, filed on Sep. 3, 2002.

(51) Int. Cl.[7] .............................................. G05D 22/00
(52) U.S. Cl. .................................... 236/44 R; 236/49.3
(58) Field of Search ............................ 236/44 R, 44 A, 236/49.3

(56) References Cited

U.S. PATENT DOCUMENTS

| | | | | |
|---|---|---|---|---|
| 2,261,852 A | * | 11/1941 | Mathis ...................... 236/44 C |
| 3,332,620 A | * | 7/1967 | Streed ....................... 236/44 R |
| 3,862,718 A | * | 1/1975 | Butler ........................ 236/49.3 |
| 4,251,026 A | * | 2/1981 | Siegel et al. ................ 236/49.3 |
| 4,953,784 A | * | 9/1990 | Yasufuku et al. .......... 236/44 A |
| 5,070,932 A | | 12/1991 | Vlasak |
| 5,253,804 A | * | 10/1993 | Sarazen et al. ............ 236/44 C |
| 5,257,736 A | * | 11/1993 | Roy ........................... 236/49.3 |
| 5,810,244 A | * | 9/1998 | Ngai ......................... 236/44 C |
| 6,116,512 A | * | 9/2000 | Dushane et al. .............. 236/51 |
| 6,711,937 B2 | * | 3/2004 | Richards et al. ........... 73/29.01 |

* cited by examiner

*Primary Examiner*—William E. Tapolcai
(74) *Attorney, Agent, or Firm*—Martine Penilla & Gencarella, LLP

(57) ABSTRACT

A ventilation controller including at least one humidity sensor for controlling the humidity of a room. The ventilation controller incorporates a housing sized and shaped to replace, or be placed in, a standard electrical junction box. Circuitry in the controller receives data from the sensor(s). The controller automatically switches on power to an exhaust fan when either the humidity exceeds a manually set humidity level and/or a rapid increase in humidity is observed. When a plurality of sensors is employed, the humidity level from a first sensor is compared by logic circuitry to the humidity levels detected at a reference sensor(s). When the humidity at the first sensor exceeds the humidity at the reference sensor(s), the ventilation controller switches on power to the exhaust fan.

16 Claims, 5 Drawing Sheets

VENTILATION SYSTEM WITH HUMIDITY RESPONSIVE VENTILATION CONTROLLER

This application claims the benefit of U.S. Provisional Application No. 60/407,677 filed Sep. 3, 2002, the disclosure of which is hereby incorporated herein by reference.

FIELD OF THE INVENTION

The present invention relates generally to a ventilation system with an environmental controller. More particularly, this invention relates to a ventilation controller for reducing or preventing humidity in a room.

BACKGROUND OF THE INVENTION

Rooms, particularly bathrooms, with poor ventilation can be regularly subjected to humid conditions. Under such conditions, moist air can have difficulty exiting the room, resulting in condensation or dewing on the room's surfaces. Moisture, in general, can lead to mold growth. Mold has been known to cause serious illness and extensive property damage.

Typically, rooms subject to high humidity contain ventilation systems that use an exhaust fan to expel the humid air from the room to the atmosphere, but these systems have known deficiencies. First, most ventilation systems are limited by their dependence on human operators to manually actuate a power switch. However, people often forget to activate the switch, especially before it is needed. Therefore, high moisture conditions exist by the time the system is activated, if it ever is.

A second type of ventilation system operates by activating the exhaust fan when the room's lights are turned on. These ventilation systems are uneconomical because they always activate the fan, even during non-humid conditions. Besides increased power usage, these systems needlessly expel conditioned air (heated or cooled) from the room. Other problems include users shutting off the lights before the excess moisture has been fully removed from the room, or they may never turn on the room's lights to begin with.

Other ventilation systems employ timers to activate and deactivate the ventilation system. These systems are also wasteful if they continue to run after the humidity has already been expelled. On the other hand, timed systems may not run long enough to fully dehumidify the room. Basically, these ventilation systems are ineffective and wasteful because they are not automated. They also do not ensure that moisture will be adequately removed from a room.

Improvements to known ventilation systems have been made in an effort to increase system automation and effectiveness. Humidity sensors are now used to detect high humidity conditions so that a ventilation system activates once a room's humidity exceeds a preset value. These settings are often predefined and may not apply to the environmental conditions for various geographical areas. Moreover, the humidity inside a building varies throughout the course of a day with temperature fluctuations, as well as during different seasons of the year. As a result, it is possible the device will perform poorly because the operating parameters, such as geographical and seasonal changes, were not accounted for.

Another effort to automate ventilation systems for humid environments includes a device using one sensor to monitor a room's humidity and circuitry to calculate average humidity over a given period of time in order to form a reference value. If the measured humidity exceeds this reference value by a predetermined amount, a ventilation controller activates an exhaust fan. A drawback to this method is that environmental humidity can fluctuate as the temperature changes each day, causing the ambient humidity to exceed the reference value. As a result, the fan may fail to operate when it is needed or may operate needlessly.

It can be seen that a need exists for a ventilation system that is fully automated, economical, and effective. It would be an improvement to have an exhaust fan automatically activated when the humidity level in a room increases above a control point but wherein a user sets the control point. In this manner, a user could account for the particular conditions of their locale. Another improvement would include a ventilation system wherein a ventilation controller activates an exhaust fan when rapidly increasing humidity is detected. In yet another improvement, a ventilation system would include a ventilation controller that activates an exhaust fan when the humidity in a room exceeds the humidity in nearby rooms. Preferably, these improvements could be used in combination with each other could include the use of wireless technology. For example, humidity sensors used to monitor the humidity in a room could communicate with the ventilation controller without a wired connection. In any event, an improved ventilation controller would only operate an exhaust fan as needed, and it would also be constructed to be mounted inside, or in place of, a standard electrical junction box such as one containing light switches. The ventilation system in accordance with the present invention provides such a ventilation controller, and it overcomes the deficiencies that have prevented the development of a satisfactory ventilation controller.

SUMMARY OF THE INVENTION

In accordance with the present invention, a ventilation system is provided that incorporates a ventilation controller constructed to be mounted inside, or in place of, a standard electrical junction box, wherein the ventilation controller activates and deactivates an exhaust fan, as needed, to reduce humidity. The ventilation system incorporates at least one humidity sensor in wired or wireless communication with the ventilation controller. The ventilation controller preferably incorporates an integrated circuit providing logic controls, although it may incorporate a mechanical humidity controller as known in the art. Generally, the ventilation controller is usable to maintain a satisfactory humidity level and to prevent, or reduce, mold growth. Importantly, it acts to prevent condensation and dewing in a fully automated manner.

The ventilation controller can be constructed to operate in a number of ways. In one embodiment, a single humidity sensor sends data to the ventilation controller, and the ventilation controller switches on power to the fan when the humidity is determined to have exceeded a value that is manually specified by a user. A potentiometer or other adjustable controller, including a ribbon in a mechanical humidity controller, can be used to set a preferred value. In another preferred embodiment, a single sensor operates with the integrated circuit to detect rapidly increasing humidity. In yet another embodiment, one or more humidity sensors monitor a room's humidity level while one or more additional reference sensor(s) measures humidity in a nearby room in order to provide a reference value. In this third embodiment, the ventilation controller provides power to the exhaust fan only when the humidity at the first sensor exceeds the humidity at the reference sensors. The various embodiments, as more fully defined below, could also be used in combination. For example, the adjustable controller may be used to set the value at which the ventilation controller should activate the exhaust fan, as in the first embodiment, but the controller would only do so if the sensed humidity were higher than the humidity at a reference sensor, as in the third embodiment. A temperature sensor may also be employed in conjunction with a humidity sensor in order to obtain a more accurate humidity value.

The ventilation controller is specifically constructed so as to mount within, or in place of, a standard electrical junction box, such as a light switch box. Therefore, it is retrofittable to existing ventilation systems. Existing wiring for an electrical junction box is usable to power the controller, and the controller is also in electrical connection with the exhaust fan and/or the room's lights. The ventilation system of the present invention also provides the ability for sensors to be remotely located from the ventilation controller. These remote sensors communicate with the ventilation controller through either wired or wireless communication means. Additional features, such as a heat source to prevent condensation on the humidity sensor or within the ventilation controller or a manual exhaust fan switch that bypasses the ventilation controller, are discussed below. As such, further objects and advantages will become apparent from a consideration of the ensuing description and drawings.

BRIEF DESCRIPTION OF THE DRAWINGS

The various other objects, features and attendant advantages of the present invention will become more fully appreciated as the same becomes better understood when considered in conjunction with the accompanying drawings, in which like reference characters designate the same or similar parts throughout the several views, and where.

DETAILED DESCRIPTION OF THE INVENTION

While the invention is described herein with reference to illustrative embodiments for particular applications, it should be understood that the invention is not limited thereto. Those having ordinary skill in the art and access to the teachings provided herein will recognize additional modifications, applications and embodiments with the scope thereof and additional fields in which the present invention would be of significant utility.

Figure 1:
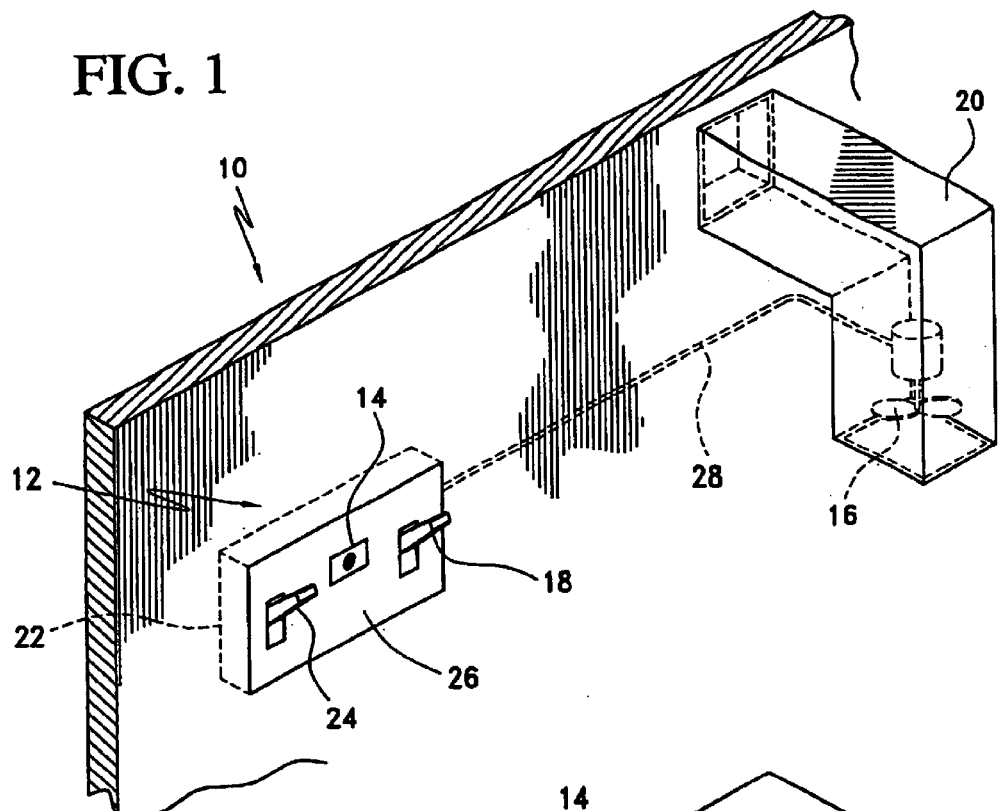
FIG. 1 is a perspective view of a ventilation system with a ventilation controller in accordance with the present invention.

Referring initially to FIG. 1, there is illustrated generally at 10 a first preferred embodiment of a ventilation system in accordance with the present invention. In this first preferred embodiment, a ventilation controller 12 incorporates a single humidity sensor 14. Ventilation controller 12 is connected to switch on power to an exhaust fan 16 and it may include a manual fan switch 18, which, if included, activates exhaust fan 16 directly, bypassing controller 12. The manual fan switch could operate the fan indefinitely or for a set period of time. Manual fan switch 18 could also operate a fan until the controller determines, by the circuitry described below, that the room is no longer humid. A user could deactivate the fan by way of manual fan switch 18 or a reset button (not shown). Exhaust fan 16 expels the room's air through an exhaust duct 20 or wall opening in a known manner.

Ventilation controller 12 is assembled in a housing 22 that is sized and dimensioned so that it can be mounted in, or in place of, a standard electrical junction box. Moreover, housing 22 includes a standard light switch 24 with an optional manual fan switch 18 and a light switch faceplate 26. Housing 22 is also constructed so that ventilation controller 12 can be connected to standard building electrical wiring (not shown). As such, it is retrofittable to an existing exhaust system by replacing a standard light switch housing or other junction box.

Ventilation system 10 can be installed in new or existing structures, and the ventilation controller 12 can be newly installed or can replace the light and/or fan switches in an existing ventilation system. In either case, an electrical cable 28 leads from ventilation controller 12 to exhaust fan 16, providing the fan with a power connection. Under the proper conditions, ventilation controller 12 switches on the power to exhaust fan 16 in order to automatically reduce or prevent humid conditions in a room.

Figure 2:
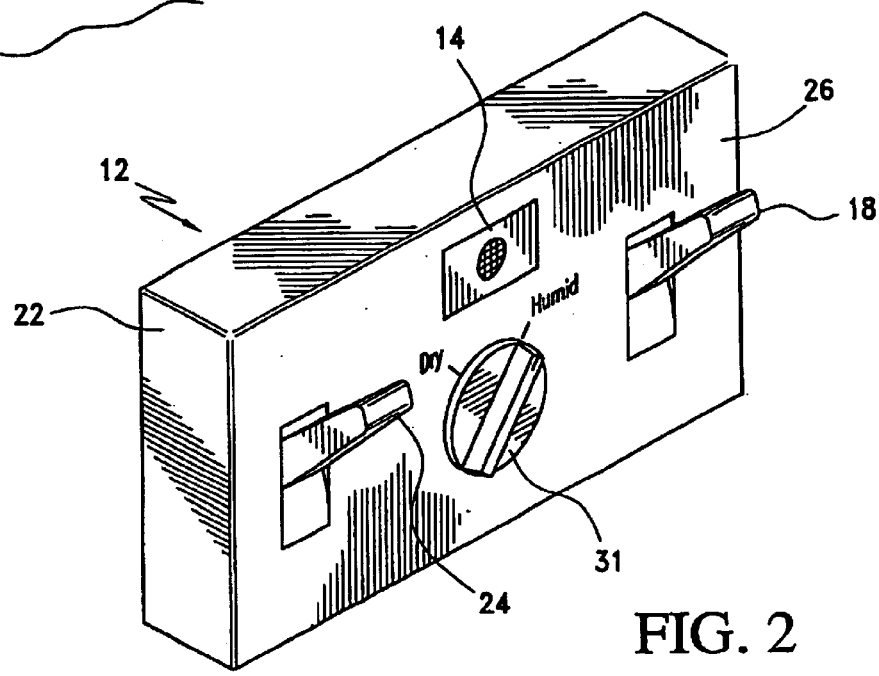
FIG. 2 is a close-up view of the ventilation controller in accordance with a preferred embodiment with the present invention.
Figure 3:
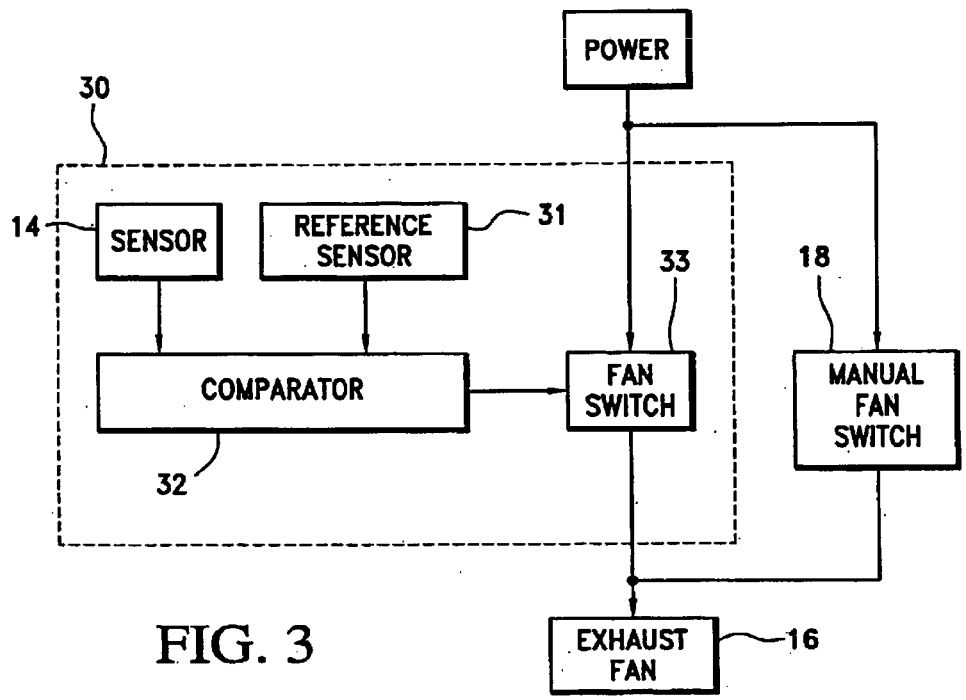
FIG. 3 is a block diagram of the logic employed by an integrated circuit in accordance with a first preferred embodiment of the present invention.

The present invention improves upon prior ventilation systems in a number of ways. In a first preferred embodiment, illustrated by FIGS. 2 and 3, at least one humidity sensor 14 monitors the humidity in a room and provides data to an integrated circuit 30 in ventilation controller 12. Integrated circuit (IC) 30 receives data from humidity sensor 14 and activates exhaust fan 16 when the humidity is determined to exceed a set value. Importantly, the exact value at which point the controller would activate the fan is manually adjusted by the user by means of a knob 31 (see FIG. 2) that is connected to a potentiometer (not shown) or other adjustable controller. A measured value from humidity sensor 14 and a user-defined value as determined by the adjustment of knob 31 are sent to comparator 32. When the room's humidity exceeds the value set by the user, the comparator sends a control signal to an electric fan switch 33 that enables electric fan switch 33 to provide power to exhaust fan 16. When the room's humidity is determined by comparator 32 to have returned to a preset level, both below or near the user set value, electric fan switch 33 is open and no power is sent to exhaust fan 16. The ability to adjust the value allows a user to tune ventilation system 10 based on varying geographical and seasonal conditions. The user can adjust the controller so that the set value exceeds ambient conditions, preventing the fan from being activated needlessly. The manual adjustment also allows ventilation controller 12 to be attuned to a user's preferences.

Figure 4:
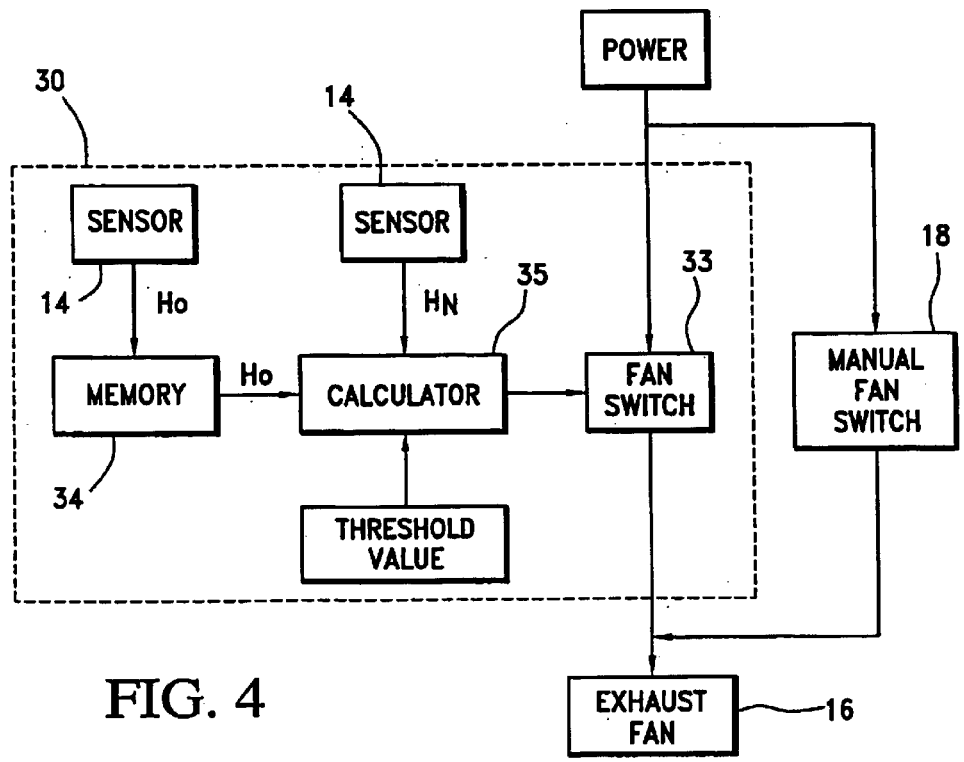
FIG. 4 is a block diagram of the logic employed by an integrated circuit in accordance with a second preferred embodiment of the present invention.

In a second preferred embodiment wherein only one humidity sensor is used to monitor a room's humidity, IC 30 calculates a gradient, or rate of change, of the room's humidity using different control logic. Gradient is defined, herein, as:

Gradient=$(H_t-H_o)/t$, where $H_t$=measured humidity at time t $H_o$=initial starting humidity at t=0 and t=a unit of time As illustrated in FIG. 4, humidity sensor 14 provides an initial value Ho that is stored in memory 34. After a period of time, determined by the predefined value of 't', humidity sensor 14 provides a value Ht to calculator 35. Calculator 35 extracts value Ho from memory 34 in order to calculate a gradient value using the equation above. The calculator also compares the gradient value to a predetermined threshold value. If the resulting gradient value exceeds a predetermined threshold value, calculator 35 provides a signal to electric fan switch 33, which in turn activates exhaust fan 16. The fan continues to operate until calculator 35 determines that value Ht, provided every 't' units of time, is about, or is less than, value Ho, as stored in memory 34. At that point, memory 34 is cleared and the process repeats. It is possible to include a timer, reset button, or some other known method for deactivating exhaust fan 16. If calculator 35 determines the calculated gradient value does not exceed the predetermined threshold value, a new humidity value is stored as Ho and the above method is repeated. A reset button (not shown) may also clear memory 34 and shut off the exhaust fan.

Figure 5:
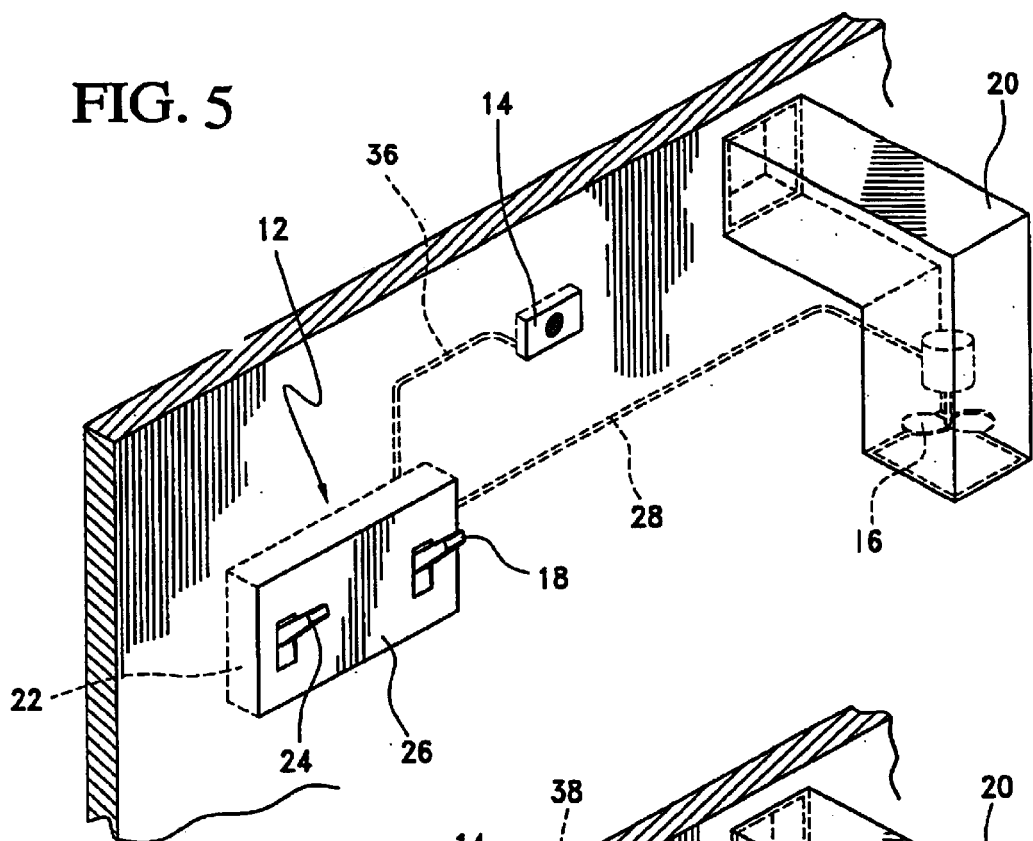
FIG. 5 is a perspective view of the ventilation system of the present invention wherein a humidity sensor is located remotely from the ventilation controller.
Figure 6:
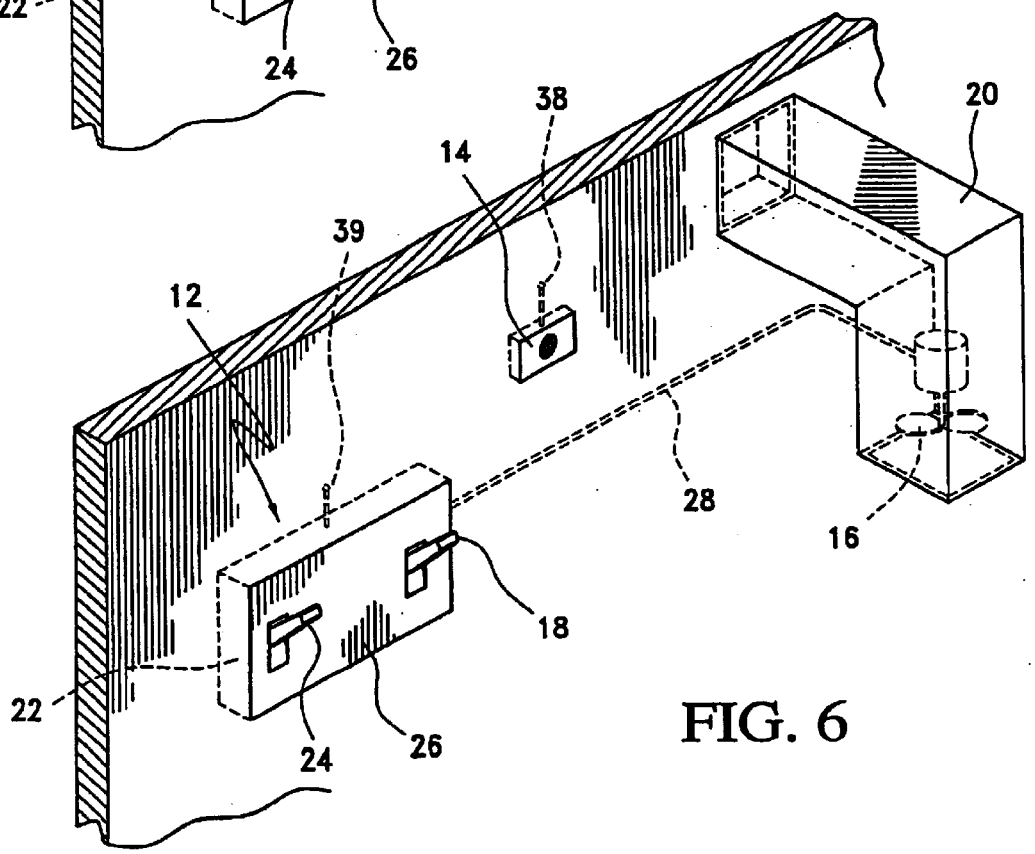
FIG. 6 is a perspective view of the ventilation system of the present invention wherein a remote humidity sensor is in wireless communication with the ventilation controller.

In certain circumstances, it would be advantageous to locate the single humidity sensor 14 in the above embodiments remotely from ventilation controller 12, as illustrated in FIG. 5. A sensor wire 36 provides communication between humidity sensor 14 and ventilation controller 12. FIG. 6 illustrates a similar embodiment, save that the sensor has a wireless transmitter 38 and ventilation controller 12 has a wireless receiver 39. In this manner, humidity sensor 14 could be placed in any type of housing (not shown), including a smoke detector, carbon monoxide detector, or the like, that could attach to a wall or ceiling in the room to be monitored. For example, in a bathroom, it would be advantageous to place the humidity sensor proximate to a shower stall or bathtub in a bathroom. This would allow humidity sensor 14 to more quickly register a change in humidity due to the user bathing than if it were located across the room adjacent a light switch. It is also easier to install a remote sensor that can wirelessly communicate with ventilation controller 12. Regardless of remote sensor is wired to ventilation controller 12 or in wireless communication therewith, the controller could activate the fan under the adjustable value and/or rate of change embodiments explained above.

Figure 7:
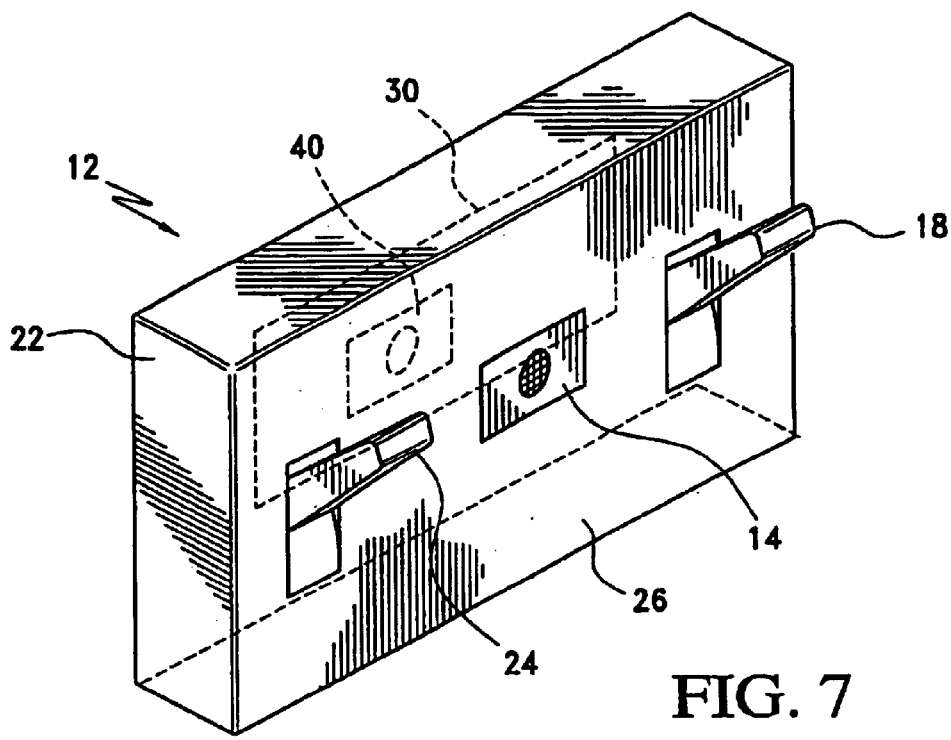
FIG. 7 is a perspective view of a third preferred embodiment of the ventilation system of the present invention wherein the system includes a reference sensor.

FIG. 7 illustrates a preferred embodiment of ventilation system 10 wherein a plurality of humidity sensors are employed. In this embodiment, the first humidity sensor 14 monitors the humidity conditions in a room while at least one reference sensor 40 is located at reference point. As illustrated in FIG. 5, reference sensor 40 is located within ventilation controller 12. This would place reference sensor 40 within the wall space bordering the room being monitored. In practice, humidity sensor 14 and a reference sensor 40 supply signals "H" and "H*r", respectively, to an integrated circuit 30. Ventilation controller 12 activates power to exhaust fan 16 when H exceeds H*r by a predetermined amount. The fan is deactivated when H falls below the reference signal H*r.

Figure 8:
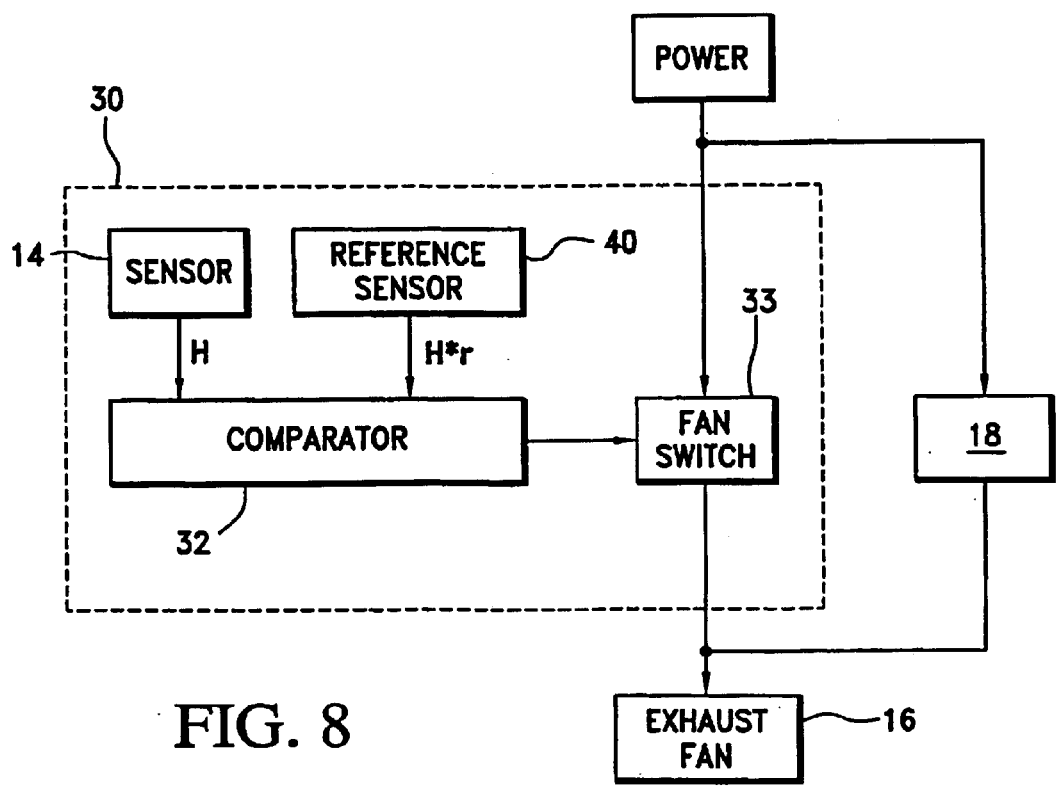
FIG. 8 is a block diagram of the logic employed by the integrated circuit in accordance with the third preferred embodiment of the present invention.

FIG. 8 is a block diagram further illustrating the control logic used by integrated circuit 30 in this multi-sensor embodiment. As described above, signals H and H*r are provided by humidity sensor 14 and reference sensor 40, respectively. A comparator 32 continuously monitors both signals. As the humidity in the room increases, humidity sensor 14 sends a signal value H that exceeds the reference signal H*r from reference sensor 40. When H exceeds H*r, comparator 32 provides a signal to electric fan switch 33. Upon receipt of the signal, electric fan switch 33 switches on power to exhaust fan 16. As above, it should be apparent to one skilled in the art that reference sensor 40 and/or humidity sensor 14 may be in wireless communication with ventilation controller 12. Wireless communication facilitates locating reference sensor 40 in another room, which would provide a more accurate measurement of the ambient humidity relative to placing reference sensor 40 within ventilation controller 12. However, the latter option is more cost effective. It should also be apparent that reference sensor 40 could be located in a nearby room while remaining in wired contact with the controller.

Figure 9:
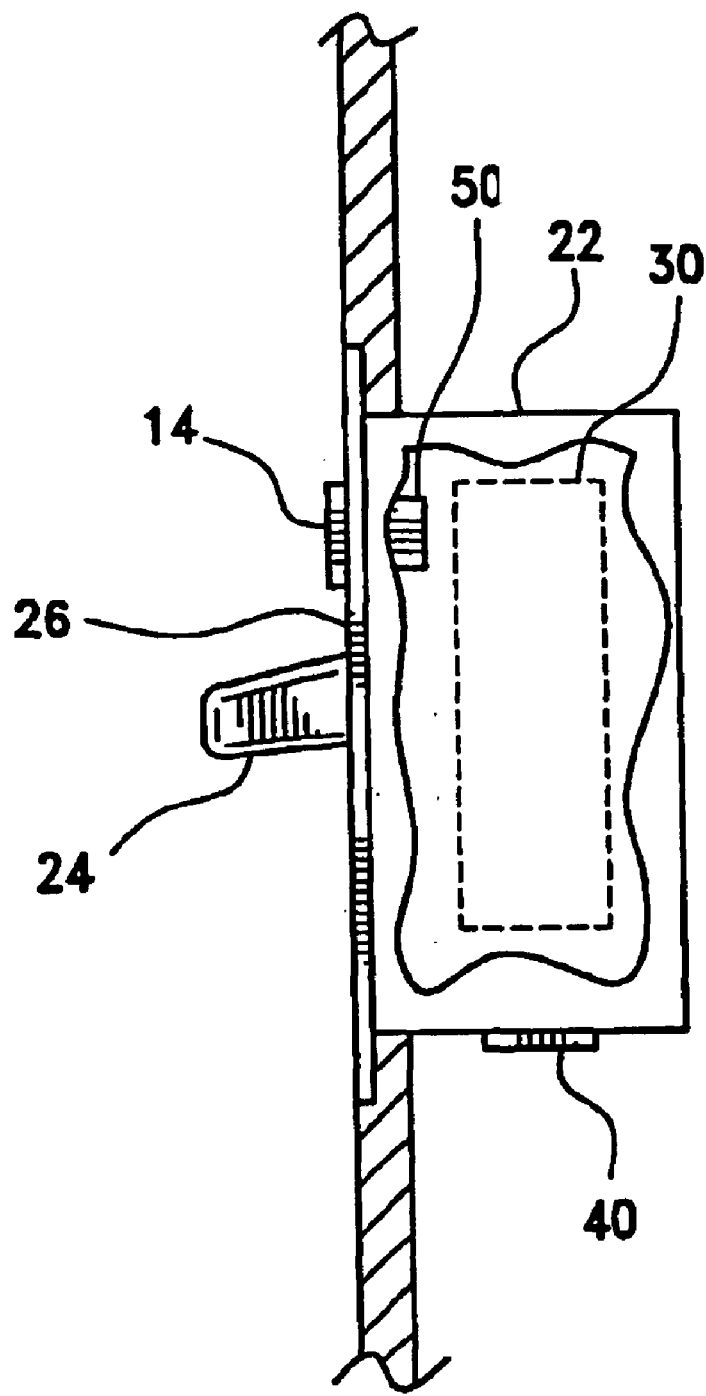
FIG. 9 is a side cut away view of the ventilation controller of the present invention further incorporating a heat source.

FIG. 9 illustrates ventilation controller 12 with the additional feature of a heat source 50. Heat source 50 could be a small heater, a heat sink connected to integrated circuit 30, or the like. Heat source 50 would prevent condensation from forming on either a humidity sensor on switch faceplate 26 or a reference sensor located within, or near, ventilation controller 12. It should be apparent that reference sensor 40 could be located on the exterior of ventilation controller 12 but within the wall space of the room being monitored. In such dark and potentially damp conditions, heat source 50 prevents condensation and/or mold growth that may impair a sensor's performance. It is possible to activate heat source 50 by a variety of means, including a manual button (not shown) on the faceplate, but, preferably, it would be activated only when integrated circuit 30 determines exhaust fan 16 is to be activated.

Overall, a significant improvement is realized in constructing the ventilation controller housing for mounting within, or in place of, a standard electrical junction box, such as a light and/or fan switch box. Housing 22 provides electrical connections (not shown) that allow ventilation controller 12 to be tied into a building's power supply and connected to existing exhaust fans. This construction provides the greatest convenience for retrofitting ventilation controller 12 into an existing ventilation system. The housing 22 may contain either an electrical or a mechanical humidity controller to improve upon such systems. However, the options of single or multiple sensors, with or without wireless communication, maximize the flexibility of ventilation system 10 to be installed in a variety of circumstances. Those skilled in the art should appreciate the value of adding temperature sensors (not shown), in conjunction with any humidity sensors, in order to more accurately determine the humidity of a room. Importantly, the various logic controls employed by the integrated circuit could be combined. Therefore, a user could provide a threshold value for comparison to a reference value, a gradient value could be compared to a reference value, a gradient value could be compared to a user set value, and the like.

Again, it should be understood that the invention is not intended to be limited to the particular forms disclosed herein. Rather, the invention is to cover all modifications, equivalents, and alternatives falling within the spirit and scope of the invention as defined by the following appended claims.

What is claimed is:

1. A ventilation system comprising:
   a housing including:
      a ventilation controller;
      a means for electrically connecting a power source to said ventilation controller;
      a faceplate located on said housing;
      at least one switch located on said faceplate; and
      at least one humidity sensor in communication with, and providing data to, said ventilation controller; and
   an exhaust fan electrically connected to said controller, wherein said exhaust fan is remote from said housing, wherein said ventilation controller includes an integrated circuit selectively operable to provide power to said exhaust fan and wherein said integrated circuit includes means to calculate a first gradient value of humidity at a first time and a second gradient value of humidity at a second time, and means to provide power to said exhaust fan when said first gradient value and said second gradient value exceeds a predetermined threshold value, wherein the housing and the exhaust fan are contained within a room to be ventilated and wherein said at least one switch located on said faceplate includes a manual fan switch, said manual fan switch in electrical connection with said fan to bypass said ventilation controller.

2. The ventilation system of claim 1, wherein said integrated circuit further includes means to compare said data provided by said humidity sensor to a user set value and means to provide power to said exhaust fan when the value off said data exceeds said user set value.

3. The ventilation system of claim 1, wherein said integrated circuit further includes means to store said data from said at least one humidity sensor.

4. The ventilation system of claim 1, wherein said at least one humidity sensor is in wireless communication with said ventilation controller.

5. The ventilation system of claim 1, wherein said at least one humidity sensor includes a first humidity sensor and a reference sensor providing said data to said integrated circuit, said integrated circuit further including means for comparing data communicated from said first humidity sensor and said reference sensor and means to provide power to said exhaust fan when said data from said first humidity sensor exceeds data from said reference sensor.

6. The ventilation system of claim 5, wherein said first humidity sensor and said reference sensor are in wireless communication with said controller.

7. The ventilation system of claim 1, wherein said ventilation controller further incorporates a heat source in electrical connection with said integrated circuit.

8. A ventilation system comprising:
   a ventilation controller contained within a housing, the ventilation controller including:
      a first humidity sensor being exposed to at least one external surface of the housing; and
      at least one switch, the at least one switch including a manual switch, the
   manual switch operable to bypass the humidity sensor; and
   an exhaust fan coupled to the ventilation controller, wherein said exhaust fan is remote from said housing, the ventilation controller and the exhaust fan being located within a first room to be ventilated, wherein the ventilation controller is operable to compare a first humidity level detected by the first humidity sensor and a reference humidity level, wherein the ventilation controller includes a device to calculate a first gradient value of humidity at a first time and a second gradient value of humidity at a second time, wherein the ventilation controller is operable to automatically activate the exhaust fan when the first humidity level exceeds the reference humidity level.

9. The ventilation system of claim 8, further comprising a second humidity sensor coupled to the ventilation controller, the second humidity sensor operable to measure a second humidity level in a second room, the second humidity level being used as the reference humidity level.

10. The ventilation system of claim 8, further comprising a second humidity sensor coupled to the ventilation controller, the second humidity sensor operable to measure a second humidity level in a second room.

11. The ventilation system of claim 8, wherein the housing is sized and shaped to replace a standard electrical junction box in the first room.

12. The ventilation system of claim 8, wherein the housing is sized and shaped to be installed within a standard electrical junction box in the first room.

13. The ventilation system of claim 8, wherein the ventilation controller is operable to automatically activate the exhaust fan when a preselected humidity level detected by the first humidity sensor is exceeded.

14. The ventilation system of claim 8, wherein the ventilation controller is operable to automatically de-activate the exhaust fan when a preselected humidity level detected by the first humidity sensor is not exceeded.

15. The ventilation system of claim 8, wherein the ventilation controller is operable to automatically activate the exhaust fan when the first humidity sensor detects an increase in humidity in the first room that exceeds a preselected rate of increase in humidity.

16. The ventilation of claim 8, further comprising a temperature sensor coupled to the ventilation controller.

* * * * *